Oct. 31, 1944.  R. J. ANDERSON  2,361,446
AUTOMATIC BREAD TOASTER
Filed Oct. 9, 1941  4 Sheets-Sheet 2
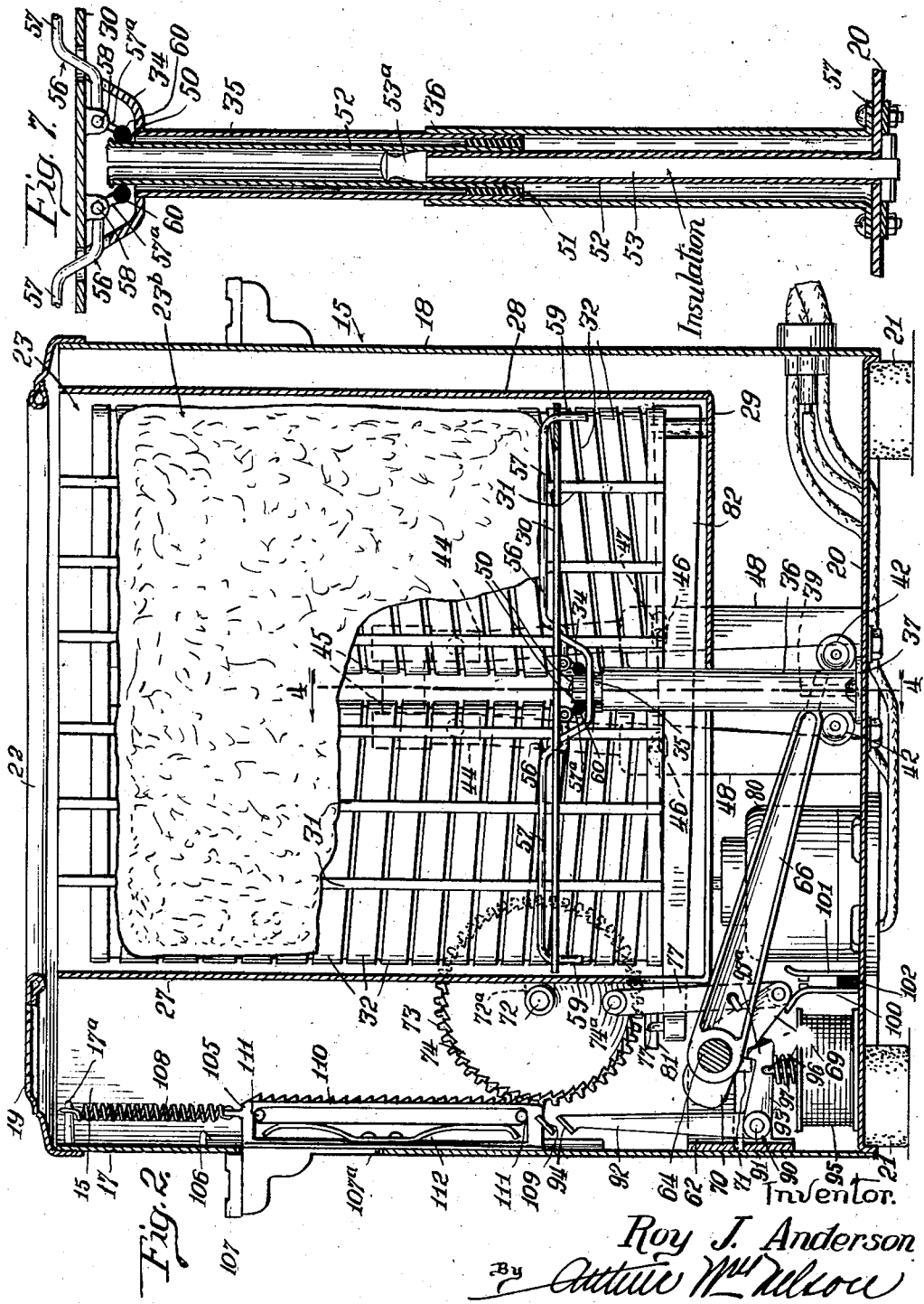
Inventor.
Roy J. Anderson
By Arthur M. Wilcox
Attorney.

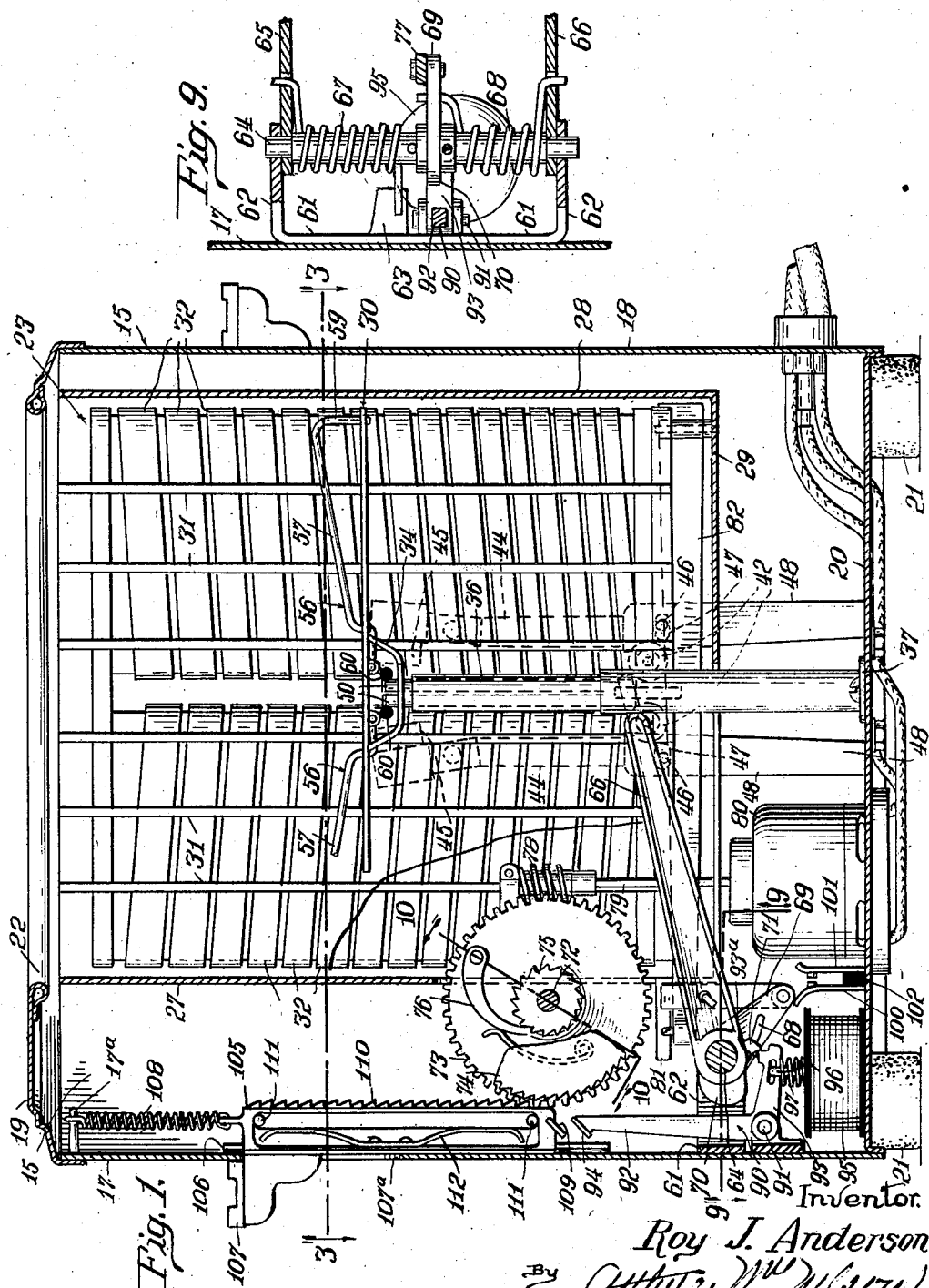

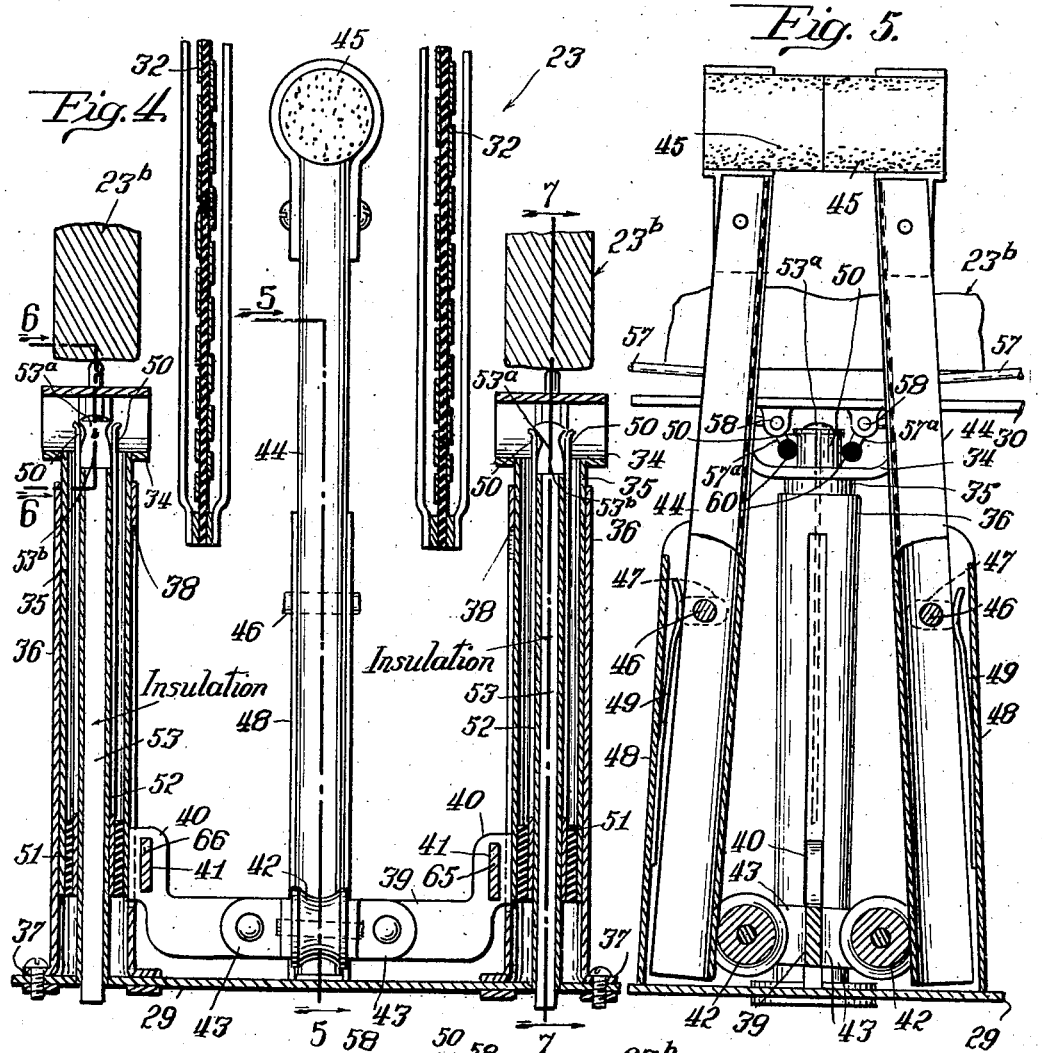

Oct. 31, 1944. R. J. ANDERSON 2,361,446
AUTOMATIC BREAD TOASTER
Filed Oct. 9, 1941 4 Sheets-Sheet 4
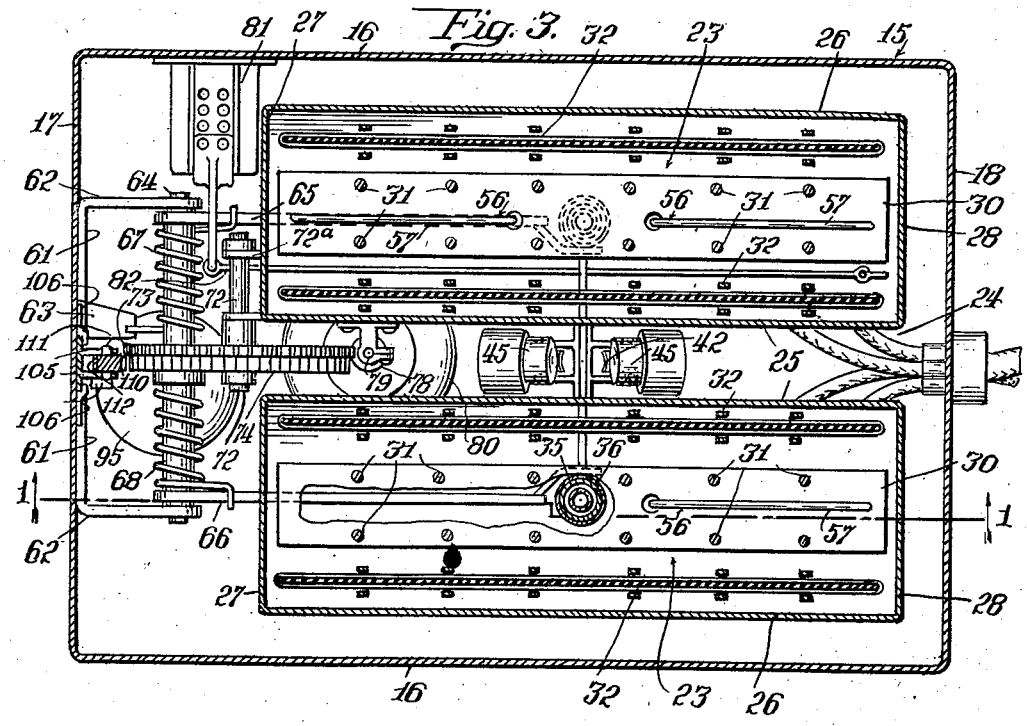
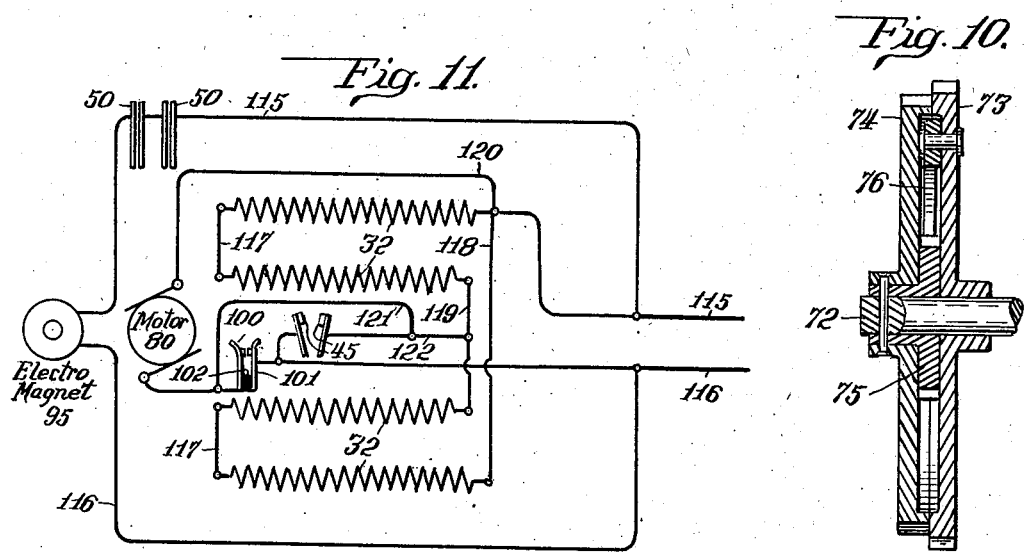
Inventor
Roy J. Anderson
Attorney.

Patented Oct. 31, 1944

2,361,446

UNITED STATES PATENT OFFICE 2,361,446

AUTOMATIC BREAD TOASTER

Roy J. Anderson, Chicago, Ill., assignor to Chicago Flexible Shaft Company, Chicago, Ill., a corporation of Illinois Application October 9, 1941, Serial No. 414,224

22 Claims. (Cl. 99—327)

This invention relates to improvements in automatic bread toasters and it consists of the matters hereinafter described and more particularly pointed out in the appended claims. The invention is more especially concerned with automatic bread toasters of the so-called "drop-in" type and wherein a toasting operation is initiated by the bread slices as the same are dropped into the bread slots of the toaster. Drop-in toasters as heretofore made required relatively large and strong electro-magnets for moving the bread supports from the bread receiving to the bread toasting position and such magnets not only increase current consumption during a toasting operation but they also increase the cost of making the toasters.

One of the objects of the present invention is to provide an automatic bread toaster of the drop-in type which is relatively simple in construction for low cost production, is efficient in operation, and at the same time is trouble-free over a long period of time.

Another object of the invention is to provide a toaster of this type which does not require a relatively strong, heavy electro-magnet therein as a prime mover for the bread support from the bread receiving position to the bread toasting position and whereby the toaster may be more economically produced.

Also, it is an object of the invention to provide a toaster of this kind that includes a motor driven means that not only times the toasting operation, but which also energizes a means which functions at the end of a toasting operation to return the bread carrier to the bread receiving position.

A further object of the invention is to provide a toaster of this kind wherein parts for initiating a toasting operation are carried by the bread supports and are actuated by the bread slices as they are dropped into the bread slots of the toaster.

The above mentioned objects of the invention, as well as others, together with the several advantages thereof, will more fully appear as the specification proceeds.

In the drawings:

Fig. 1 is a longitudinal vertical sectional view through an automatic bread toaster of the drop-in type, embodying the preferred form of the invention, with the bread supports in their bread receiving position, the plane of the section being indicated by the line 1—1 of Fig. 3.

Fig. 2 is a view similar to Fig. 1 and illustrates the bread supports in their bread toasting position.

Fig. 3 is a horizontal sectional view through the improved toaster as taken on the line 3—3 of Fig. 1.

Fig. 4 is a detail transverse vertical sectional view through the toaster, on an enlarged scale, as taken on the line 4—4 of Fig. 2.

Fig. 5 is a detail longitudinal vertical sectional view through parts shown in Fig. 4 as taken on the line 5—5 of Fig. 4.

Fig. 6 is another detail longitudinal vertical sectional view through a part of the mechanism appearing in Fig. 4 as taken on the line 6—6 of said Fig. 4, showing the parts when the bread carriers or supports are in bread toasting position.

Fig. 7 is a detail vertical sectional view through a part of the toaster as taken on the line 7—7 of Fig. 4 when the bread carriers or supports are in their bread receiving position.

Fig. 8 is a perspective view of the top end portion of a portion of a split tube switch part embodied in the improved toaster and which will be more fully referred to later.

Fig. 9 is a horizontal detail sectional view through a part of the improved toaster as taken on the line 9—9 of Fig. 1.

Fig. 10 is a vertical sectional view through a part of a certain one-way clutch embodied in the improved toaster, the plane of the section being indicated by the line 10—10 of Fig. 1 and on a scale enlarged over that of said Fig. 1.

Fig. 11 is a diagrammatic view of the circuit of the improved toaster.

Referring now in detail to that embodiment of the invention illustrated in the drawings, 15 indicates as a whole the generally rectangular casing of the toaster which is of conventional construction so as to include side walls 16—16, front and rear end walls 17 and 18 respectively, a top wall 19 and a bottom wall or floor 20. Feet 21 are secured to the four corners of said bottom wall or floor whereby the casing is somewhat elevated with respect to the support upon which it is placed. In the top wall 19 of the casing is a pair of laterally spaced, longitudinally extending slots 22—22 through which the bread slices 23b (see Figs. 2—4—5 and 6) to be toasted are introduced into the casing as by dropping such slices edgewise through said slots. Only one of said slots appears in Figs. 1 and 2 of the drawings. The rear end of the slots 22 is relatively close to the rear wall 18 of the casing while the front end of said slots is spaced a greater distance away from the front wall 17 of said casing.

Within the casing are toasting chambers or ovens 23—23, disposed below and generally coextensive with each slot 22. This arrangement leaves a space 24 (see Fig. 3) between said chambers, in the median line of the casing. Each chamber 23 includes inner and outer side walls 25 and 26 respectively, front and rear end walls 27 and 28 respectively and a bottom wall 29 which is spaced a suitable distance above the bottom wall or floor 20 of the casing.

In each toasting chamber 23 is a bread slice support or carrier 30 in the form of an elongated, horizontally disposed plate. Each support or carrier, as will later appear, has a vertical guided movement in the associated chamber, from the bread receiving position shown in Fig. 1 to the toasting position shown in Fig. 2 and back to said receiving position. Associated with the lateral margins of each bread support 30 is a plurality of longitudinally spaced apart, vertically extending bread guide rods 31. Said rods are fixed at their top ends to the top wall 19 of the casing for support and the bottom end portions of said rods have sliding engagement in holes provided therefor in said supports. These rods hold the slices of bread being toasted in proper position in their respective toasting chambers.

Between each lateral edge of each bread support 30 and the side walls 25—26 of the associated toasting chamber is an electric heating element 32 of any approved kind.

Each bread support or carrier is provided at its central portion with a downwardly extending saddle 34 that is fixed to the upper end of a vertically disposed tube 35. Each tube 35 has a telescopic sliding engagement in the upper end portion of a rigid guide tube 36 the bottom end of which is formed as a radial flange 37 that is fixed to the bottom wall or floor 20 of the casing. In each guide tube is a longitudinally extending slot 38, the slot 38 in one tube facing the like slot in the other tube, as is obvious from Fig. 4. An edgewise disposed bar 39 (see Fig. 4) extends between and connects the tubes 35 together. The ends 40—40 of said bar, each extends through an associated slot 38 in guide tube 36 and has a riveted connection with the tube 35 telescopically slidable within the same. In each end 40 of the bar 39 just outside the associated tube 36, is a vertical slot 41. At the central part of the bar and located one on each side thereof is a pair of grooved rollers 42, each roller being journalled in a pair of brackets 43 fixed to the associated side of the bar. The purpose of the slots 41 and the rollers 42 before mentioned will appear later.

It is obvious that the tubes 35 which carry the bread supports or carriers 30—30 on their top ends, because of the bar 39, will be moved simultaneously from the bread receiving position shown in Fig. 1 to the toasting position shown in Fig. 2, when a downward vertical movement is imparted to the bar 39.

The rollers 42 which are disposed in the longitudinal median plane of the casing 10, and therefore midway between the chambers 23—23, have a peripheral engagement with a pair of substantially upright arms 44—44, the top end of each of which carries a contact 45 and which contacts face each other as best appears in Figs. 1—2 and 5. These arms and their contacts constitute the main switch of the toaster as a whole, for the control of the heating elements and a timing motor hereinafter mentioned. Each arm is provided at a point between its ends with laterally extending studs 46 which engage in transverse slots 47—47 in opposed sides of a pair of upwardly and inwardly inclined channel-like guides 48—48 rising from the bottom wall of the casing. In each guide 48 is a leaf spring 49 that engages the edge of the arm 44 in the same guide at about the plane of the studs 46.

The structure described, provides a floating pivotal mounting for the arms 44. When the rollers 42 move upwardly with the bar 39 from the position shown in Fig. 5, they will ride along the opposed edges of the arms 44 and after they have passed through the horizontal plane of the studs 46, they will spread the upper ends of the arms and cause the contacts 45—45 to disengage and open the circuit with which said contacts are associated. When the rollers 42 move downwardly, they will ride along the opposed edges of the arms 44 and as they pass through the horizontal plane before mentioned, they will spread the lower ends of said arms apart and cause the contacts 45—45 to engage and close said circuit and thus energize the heating elements and motor previously mentioned.

Located in and movable with each tube 35 is a pair of semi-tubular and normally spaced apart contact members 50—50 which are fixed at their bottom ends in a bushing 51 of insulation and which bushing in turn is fixed in the bottom end of the associated tube 35. The semi-tubular contact members have a sliding contact engagement and movement upon a pair of associated semi-tubular contact members 52 which are fixed at the bottom end to and are suitably insulated from the bottom wall of the casing. A rod 53 of insulating material is associated with each pair of contact members 52 and the body of said rod which is normally disposed in between said members 52, has a head portion 53a of a diameter larger than that of the body and joins the body by a shoulder 53b. This rod normally seats with its shoulder on the top end of the contact members 52. The rod 53 functions not only to insulate the members 52 from each other but also functions to separate the upper ends of the associated contact members 50—50 when the bread carriers 30—30 move into toasting position so as to break the circuit in which said members 50—50 are disposed.

When the bread carriers 30—30 are in their bread receiving position, the top end portions of the semi-tubular contact members 50—50 which are made of spring metal, are spaced a considerable distance above the head 53a of the rod 53, as in Fig. 7. When said portions and said rod 53 are in this position, said portions may be caused to yield toward each other into contacting relation to close the circuit with which they are associated. However, as said contact members are made of spring metal as before mentioned, said top end portions normally spring apart and tend to normally hold said circuit open. When the carriers descend to toasting position, the said top end portions of said contact members, when in circuit closing engagement, are forced apart by the head of the rod 53 associated with said members, as will later appear, to open the circuit.

A pair of bread slice engageable triggers 56 is associated with each bread carrier. Each trigger is in the form of a bell crank that includes a relatively long power arm 57 and a shorter actuator arm 57a. The inner end portion of the power arm of each trigger passes through an opening provided therefor in the bread carrier and is disposed beneath the same and the junction of the two arms 57—57a of each trigger is pivotally mounted as at 58 on the under side of the bread carrier. The outer end of the power arm has a downturned portion 59 (see Figs. 1 and 2) that extends through the bread carrier so as to provide a sliding guide for this end of each trigger arm. The free end of the actuator arm of each trigger carries a block of insulation 60 and the blocks of insulation of both triggers at all times engage the opposed sides of the upper end portion of the associated semi-tubular contact members 50—50.

When the bread carriers 30—30 are in their bread receiving position and when no bread slices are engaged upon the carriers, the natural spring action of the contact members 50—50, acting against the actuator arms 57a, is sufficient to offset the weight of the long arms 57 of the trigger which are made of a relatively light gauge wire. However, when bread is entered edgewise into the toaster through the slots 22 and engages the long arms 57 of the triggers, said arms are depressed to swing about their pivots 58. This swings the actuator arms 57a of both triggers toward each other and causes the upper end portions of the semi-tubular contact members 50—50 to engage each other to complete a circuit for a purpose later to appear.

On the inner face of the front wall 17 of the casing, toward the bottom thereof, and in the longitudinal median line of the bracket, there is mounted a bracket 61 (see Figs. 3 and 9) that includes a pair of laterally spaced rearwardly extending arms 62 and a spring end abutment 63. A rock shaft 64 is journalled at its ends in said arms 62. Just inside of each arm 62 there is fixed to the shaft, arms 65 and 66 respectively, that extend rearwardly toward the guide tubes 36—36. The rear end of each arm is offset inwardly so as to extend through the associated slot 41 in the cross arm 39 before mentioned. For convenience, the arm 65 will be referred to as the "starting" arm because it is this arm that causes the bread carrier to descend or move from bread receiving to toasting position and the arm 66 will be referred to as the "ejector" arm because it is this arm that causes the carrier to ascend or move from the toasting position to bread receiving position, after a toasting operation.

A torsion spring 67 surrounds that part of the shaft 64 to which the starting arm 65 is fixed and one end of said spring is anchored in said arm and the other end engages the abutment 63. A second and stronger or stiffer torsion spring 68 surrounds that part of the shaft 64 to which the ejector arm 66 is fixed and one end of said spring is anchored in said arm and the other end of said spring is anchored in a bell crank-like arm 69 loose on the shaft 64 midway between the arms.

The arm 69 extends rearwardly from the shaft and includes a forwardly and downwardly extending cam 70. A collar is fixed to the shaft 64 adjacent the arm 69 and includes a lug 71 on its bottom side and the purpose thereof will appear later.

72 indicates a second horizontal shaft parallel with the shaft 64 but located in a plane rearwardly of and above that of said shaft. The shaft 72 is journalled in brackets 72a (see Fig. 3) carried by the front wall 27 of one of the ovens 23, and its inner end extends across the median line of the casing as a whole. A worm gear 73 is loosely mounted on the inner end of said shaft, adjacent the bracket and a hollowed out ratchet wheel 74 is fixed to the shaft. The ratchet wheel includes a ratchet hub 75 with which a spring pressed pivoted pawl 76 carried by the worm wheel engages. The ratchet wheel 74 carries a wrist pin 74a and a link 77 operatively connects the wrist pin with the forward end of the arm 69.

A worm 78 meshes with the worm wheel 73 and said worm is mounted on the upper end of a vertical shaft 79 (see Figs. 1 and 2). The bottom end of the shaft 79 is operatively connected to the armature shaft of a relatively small, variable speed electric motor 80. This motor is mounted upon the floor 20 of the toaster casing. The variation of speed of said motor is controlled by a rheostat 81 shown diagrammatically in the upper left hand corner of Fig. 3. Operation of the thermostat is controlled by a bi-metal bar 82 located at the bottom of one of the ovens 23 adjacent its inner wall 25. The bar, of course, is suitably connected to the rheostat to actuate the same. When a relatively high temperature is present in the casing, the bar 82 is warped and actuates the rheostat to cause the motor 80 to run at a higher speed. When the toaster is "cold," as before a period of use, the bar functions through the thermostat to cause said motor to run "slower." Thus it is the speed of the motor which times the operation of the toaster so that when the toaster is started from a "cold" condition, the bread supports are held in toasting position for a longer period of time. When the toaster is "hot" as between two successive toasting operations, the bread supports are held in toasting position for a shorter length of time. Thus, by means of the variable speed motor, the timing function of the toaster is regulated.

90 indicates, as a whole, a bell crank lever that is pivoted on a horizontal axis as at 91 adjacent the front bottom corner of the casing. This bell crank lever which is disposed in the vertical plane of the arm 69 and lug 74, includes a substantially upright arm 92 and a substantially horizontal arm 93. The upper end of the arm 92 includes a cam-like lip 94, the purpose of which will soon appear. The arm 93 of said bell crank overhangs an electromagnet 95 mounted on the floor of the casing near its front wall 17. The armature 96 of said magnet has a pivotal connection with the arm 93 and a spring 97 surrounds that part of the armature between said arm and the top of the magnet. When the magnet is energized, it imparts a downward pull on the arm 93 against the action of the spring. When the magnet is deenergized, the spring expands and returns the arm 93 to its normal position.

The front end of the arm 69 overhangs a pair of normally disengaged spring contact members 100 and 101 secured to the bottom of the casing and suitably insulated by a block of fibre 102 or the like. When the arm 69 is in its normal position, its rear end engages and holds the contact 100 separated from the contact 101 and breaks the circuit in which said members are disposed. When the arm 69 swings upwardly, as will later appear, then said fingers 100 and 101 again engage with each other and this will close the circuit in which said contact fingers are disposed.

105 indicates an open frame-like member that slides in vertical guides 106 on the inner face of the front wall 17 of the casing. This frame-like member carries a handle 107 on the outside of said wall and a part of said handle slides in suitable slot 107a (see Fig. 1) provided therefor in said front wall. A spring 108 connects the upper end of said frame with a stud 17a on the upper end of the casing wall 17 and the tendency of said spring is to return the frame 105 upwardly in its guide 106 to its normal position. The bottom end of said frame includes a cam-like lip 109 which is arranged to engage the lip 94 on the bell crank lever 90 when said frame is moved downwardly by depressing upon the handle 107. When pressure is released from the handle 107, the spring 108 returns the frame to its normal uppermost position.

The frame 105 carries a ratchet bar 110 which is disposed in the plane of the ratchet wheel 74 so that when said frame is pressed downwardly as before mentioned, the ratchet bar will engage the ratchet wheel and impart a turning movement thereto. The ratchet bar is provided with lateral studs 111 which are normally pressed against the front parts of the frame by a leaf spring 112 that is carried by the rear parts of the frame.

In Fig. 11, I have illustrated digrammatically a circuit for the toaster and wherein 115 and 116 indicate current conductors connected to a source of supply and leading to the electromagnet 95. In the line 115 is located the switch afforded by the semi-cylindrical tube parts 50—50. When said tube parts are engaged the circuit to the electro-magnet 95 is closed so that it is energized. The heating elements 32—32 in each oven are connected together at one end by the lines 117—117 and like elements in each oven are connected together at the opposite ends by the lines 118—119 respectively. A line 120 leads off from the conductor 115 to one side of the motor 80 and the other side of the motor is connected by a line 121 with a line 122 which in turn is connected at one end to the line 119. The line 122 is connected to the spring finger member 100 and the other spring finger member is connected to the line 121. In line 122 is located the main switch of the toaster as formed by the arms 44 and contacts 45.

When the toaster is in its "cold" condition, as well as when the toaster has completed a toasting operation, the bread carriers 30—30 are in their upper or bread receiving position, the contacts 45—45 are out of engagement with each other, the semi-tubular contact members are out of engagement with each other and the contact fingers 100 and 101 are also out of engagement with each other. At this time, the rods 53 are in the position wherein their shoulders 53b are seated on the top end of the semi-tubular, fixed contact members 52—52 as best appears in Fig. 7.

It is pointed out that when the bread carriers are in the bread receiving position, as appears in Fig. 1, they are held in this position by reason of the engagement of the lug 71 on the shaft 64 with the rear face of a lug 93a on the upper surface of the arm 93, against the action of the spring 67 tending to move the bread carriers to toasting position.

When slices of bread are dropped into the casing through the slots 22 in said top wall thereof, in line with the bread carriers or supports, said slices, as they approach said carriers or supports, engage the outer ends of the long arms of the triggers 56 of each support. This causes the triggers to swing about their pivot points 58 so that the insulation blocks 60 on the short arms of the triggers move the upper end of the associated semi-tubular contact members 50—50 into engagement with each other. This closes the circuit to the electromagnet 95 which attracts its armature 96 and pulls the same downwardly. As the armature is connected to the arm 93, it pulls the same downwardly and at the same time compresses the spring 97 to store up energy therein.

As the arm 93 swings downwardly, the lug 93a thereon moves out of engagement with the lug 71 on the shaft 64 so that the shaft is unlocked. The spring 67, which at this time is energized, then functions to swing the shaft 64 clockwise in Figs. 1 and 2 so that the lever arms 65—66 swing downwardly. As the free end of said arms are engaged in the slots 41 of the cross bar 39 which connect the bread carrier supporting tubes 35—35 together, the bread carriers move downwardly into toasting position. In this movement of the carriers to toasting position, the lug 71 swings clockwise (in Fig. 1) to engage behind the lug 93a on the lever 93 which has by this time returned to normal position because, as will later appear, the magnet 95 will have been only momentarily energized.

As the bread carriers move downwardly, the semi-tubular contact members 50—50 have a sliding engagement with the enlarged head 53a of the insulator rod 53 which forces the upper ends of said contacts apart to break the circuit to the magnet 95 to deenergize the same. Thus, as is obvious, the magnet is energized only for that length of time that it takes the carriers to move from the bread receiving position to the bread toasting position.

In the downward movement of the bread carriers, the rollers 42 will roll downwardly along the opposed edges of the contact arms 44, said arms yielding away from each other as the rollers pass the horizontal plane of the pin and slot pivotal connection 46—47 therefor. After said rollers have passed said plane, they spread the bottom ends of said arms apart so that said arms swing about their said pivots when the contacts 45—45 engage each other and close the line 122 so that the circuit is closed not only to the heating elements 32—32 but also to the motor 80, to energize the latter. At this time the end of the arm 69 is still engaged with the contact finger 100 so that it is still separated from the associated finger 101.

With the heating elements energized, the bread slices are toasted from both sides and as the motor 80 is now energized, it will through the shaft 79 and worm 78 drive the worm gear 73 in a counterclockwise position when viewed as in Figs. 1 and 2. When the worm 78 starts driving the gear, it will through the pawl 76 and ratchet 75 drive the ratchet wheel 74 in the same direction as the worm gear. By reason of the link connection between the arm 69 and the ratchet wheel 74, the wrist pin 74a in its upward movement in its throw, will act through said link 77 to exert an upward lift on the arm 69 so that the cam part 70 thereof will swing downwardly toward the arm 93 of the bell crank lever 93. In this upward movement of the arm 69, the cam will approach and then engage the arm 93 so as to depress the same and at the same time the arm 69 will release the contact finger 100 so that it will then spring into engagement with the finger 101 whereby the circuit is closed to the motor 80 not only through the contacts 45—45 but also through the contact fingers 100—101.

Also in the upward throw of the wrist pin and in the upward movement of the arm 69, the arm will act to wind up or torsionize the spring 68 which, as before described, has one end attached to said arm and has its other end attached to the lever arm 66 which is still in its locked position by reason of the engagement of the lug 71 with the front side of the lug 93a as appears in Fig. 2.

As the wrist pin 74a approaches the top of its throw and just before it passes through the vertical plane of the shaft 64, the cam 70 will have depressed the arm 93 to that extent wherein the lug 71 (on the shaft 64) will be released from behind the lug 93a on said lever so that the arms 65 and 66 swing upwardly under the action of the energy in the spring 68. This returns the bread carriers to the bread receiving position for the removal of the toasted bread slices and at the same time separates the main contact 45—45. Also in this movement of the lever arms 65 and 66 and bread carriers to bread receiving position, the spring 67, which is not as strong as the spring 68, becomes torsionized for the next operation, the parts being again locked in this position by reason of the engagement of the lug 71 in front of the lug 93a.

In the return of the bread carriers to bread receiving position, the insulation rod 53, which is now gripped between the upper ends of the associated members 50—50, moves therewith so as to assume the position shown in Fig. 6. As long as the toasted bread remains in the toaster and engaged upon the trigger, the weight of the bread acting upon the triggers will hold said rods in this position so that contact cannot be made between the associated semi-tubular contact members 50—50.

However, as soon as the toasted bread is removed from the toaster, this takes the weight of the toasted bread off the trigger so that the upper ends of said members 50—50 are free to spread apart. When this occurs, the rods 53—53 drop downwardly by gravity due to their weight, until the shoulders thereof engage upon the top end of the members 52 as appears in Fig. 7. In the spreading apart of the top ends of said members 50—50, they will function through the arms 51c of the triggers to restore the arms of the triggers to their normal position, ready to be engaged by the next slice of bread dropped into the toaster.

It is pointed out that the bread carriers 30—30 are returned to bread receiving position just before the wrist pin reaches the top of its throw, and it is carried over the top center of its throw because at this time, the motor 80 is still being energized through its circuit as said circuit is still maintained in its closed condition through the contacts 100 and 101, even though the contacts 45—45 are separated. As said wrist pin passes over the top center of its throw, the spring 68 which is now energized, will swing the arm 69 downwardly and through said arm 69 and link 77, cause the ratchet wheel 74 to overrun the gear 73 to return the wrist pin to the bottom of its throw and which is its starting position. In this movement of the arm 69, it will engage the contact finger 100 and separate it from the contact 101 so that the motor 80 is deenergized.

Should it be desired to start another toasting operation immediately after the preceding one, it is only necessary to drop the slices of bread into the toaster as before, and operation of the toaster is again initiated automatically. When so initiating a second toasting operation, it is obvious that the residual heat in the toaster casing will cause the bi-metal bar 82 to function and advance the rheostat 81 to speed up the motor 80 so that it runs faster during the second toasting operation, the increase in speed of the motor being in proportion to the temperature in the casing.

Assume that during the toasting operation that because of the texture of the bread being toasted, said bread starts to "burn" and produces smoke. Under such conditions, it is desirable to terminate the toasting operation immediately and this may be done manually as follows:

Downward pressure is imposed upon the handle or knob 107 and as this handle or knob is connected to the open frame 105, said frame slides downwardly in its guides 106. As said frame carries the rack bar 110, said bar is caused to engage the teeth of the ratchet wheel 74 and through the one way ratchet mechanism between it and the worm gear 73, said ratchet wheel is turned independently of the worm gear.

In the downward movement of the frame, the cam lip 109 on said frame will engage the cam lip 94 on the lever arm 92 and cause it to swing clockwise, depressing the arm 93 to release the lug 71 so that the arms 65 and 66 are free to swing upwardly and return the bread carriers to bread receiving position. Also, in the downward movement of said frame, the rack bar 110 will engage the teeth of the ratchet wheel and cause it to turn counterclockwise until the wrist pin passes through the top center of its throw when the arm 69 swings into its lower and normal position to again separate the contacts 100 and 101 to open the circuit to the toaster as a whole.

When the handle or knob 107 is released, the spring 108 returns the frame 105 to its upper position, the rack bar 110 yielding inwardly of said frame, against the action of the spring 112 so that said rack bar clicks past the ratchet wheel.

It is apparent from the above, that the toaster described is entirely automatic in its operation and that all that it is necessary to do to initiate a toasting operation is to drop the slices of bread to be toasted into the bread slots of the casing. When the toasting operation is completed, the toasted bread is elevated to a position for convenient removal.

The toaster is devoid of any electromagnets for moving the bread carriers from one position to the other, the power for so moving the bread carriers being furnished by simple and inexpensive torsion springs energized by the timing motor.

While in describing the invention, I have referred in detail to the form, arrangement and construction of the parts involved, the same is to be considered only in the illustrative sense so that I do not wish to be limited thereto except as may be specifically pointed out in the appended claims.

I claim as my invention:

1. A bread toaster embodying therein a bread carrier movable from a bread receiving position to a toasting position and back to said bread receiving position, means including a spring providing the power for moving the carrier from said receiving position to said toasting position, means actuated by the bread as it approaches the carrier while in said receiving position for causing said means to operate through said spring to move the carrier from said receiving position to said toasting position, means for holding said carrier in toasting position for a predetermined period of time, and means operating at the expiration of said period of time for returning said carrier to said receiving position.

2. A bread toaster embodying therein a bread carrier movable from a bread receiving position to a toasting position and back to said receiving position, preenergized means for moving the carrier from said receiving position to said toasting position, means for returning the carrier to said receiving position at the end of a toasting operation, means operative by the bread to be toasted when it approaches the carrier for causing said preenergized means to move the carrier from said receiving position to said toasting position, means for determining the length of time the carrier remains in said toasting position, said timing means functioning during a toasting operation to store up energy in said means for returning said bread carrier to said receiving position, said last mentioned means when returning the carrier to bread receiving position, functioning to reenergize said preenergized means.

3. A bread toaster embodying therein a bread carrier movable from a bread receiving position to a toasting position and back to said receiving position, power means for moving the carrier from said receiving position to said toasting position, spring means for moving the carrier from said toasting position to the receiving position, means operable by the bread as it approaches said carrier while in said receiving position for causing the first mentioned means to move said carrier from said receiving position to said toasting position, and timing means operable when said carrier is in said toasting position for energizing said spring means and at the end of a timing operation causing said spring means to return the carrier to said receiving position.

4. A bread toaster embodying therein a bread carrier movable from a bread receiving position to a toasting position and back to said receiving position, spring means for moving the carrier from said receiving position to said toasting position, energizable means for moving the carrier from said toasting position to the receiving position, means operable by the bread as it approaches said carrier while in said receiving position for causing said spring means to move the carrier from said receiving position to said toasting position, timing means operable when the carrier is in said toasting position for energizing said energizable means and at the end of a toasting operation causing said energizable means to return the carrier to said receiving position.

5. A bread toaster embodying therein a bread carrier movable from a bread receiving position to a toasting position and back to said receiving position, a spring for moving the carrier from said receiving position to said toasting position, a second spring for moving the carrier from said toasting position to the receiving position, means operable by the bread as it approaches the carrier while in said receiving position for causing the first mentioned spring to move the carrier from said receiving position to said toasting position, and timing means operable when said carrier is in said toasting position for energizing said second spring and at the end of a timing operation causing said spring to return the carrier to said receiving position.

6. A bread toaster embodying therein a bread carrier movable from a bread receiving position to a toasting position and back to said receiving position, energized power means for moving the carrier from said receiving position to said toasting position, means for releasably holding said power means energized, spring means for moving the carrier from said toasting position to the receiving position, means operable by the bread as it approaches said carrier while in said receiving position for actuating the second mentioned means to release said energized power means to move the bread carrier to the toasting position, and timing means operable when said carrier is in said toasting position for energizing the spring means and at the end of a timing operation causing said spring means to return the carrier to said receiving position.

7. A bread toaster embodying therein a bread carrier movable from a bread receiving position to a toasting position and back to said receiving position, energized power means for moving the carrier from said receiving position to said toasting position, electrically operable means for releasably holding said power means energized, a circuit for said electrically operable means, spring means for moving the carrier from said toasting position to said receiving position, means operable by the bread as it approaches said carrier while in said receiving position for so affecting said circuit as to cause said electrically operable means to release said power means so that it functions to move the bread carrier to said toasting position, and timing means operable when said carrier is in said toasting position for energizing said spring means and at the end of a timing operation causing said spring means to return the carrier to said receiving position.

8. A bread toaster embodying therein a bread carrier movable from a bread receiving position to a toasting position and back to said receiving position, a normally energized spring for moving the carrier from said receiving position to said toasting position, a second spring for moving the carrier from said toasting position to the receiving position, electrically operable means for releasably holding the first mentioned spring energized, a circuit for said electrically operable means, means operable by the bread as it approaches said carrier while in said receiving position for so affecting said circuit as to cause said electrically operable means to release the first mentioned spring so that it moves the carrier from the receiving position to the toasting position, and timing means operable when the carrier is in said toasting position for energizing the second mentioned spring and at the end of a timing operation causing said spring to return the carrier to said receiving position.

9. A bread toaster embodying therein a bread carrier movable from a bread receiving position to a toasting position and back to said receiving position, a normally energized means for moving the carrier from said receiving position to said toasting position, means for holding said normally energized means against operation so that said carrier remains in said receiving position, means operable by the bread as its approaches said carrier while in said receiving position for actuating said holding means so that said energized means operates to move the carrier to toasting position, means for moving said carrier from said toasting position to the receiving position, and timing means operable when said carrier is in toasting position for energizing said last mentioned means and at the end of a timing operation causing said means to move said carrier from said toasting position to said receiving sition.

10. A bread toaster embodying therein a bread carrier movable from a bread receiving position to a toasting position and back to said receiving position, power means for moving the carrier from said receiving position to toasting position, means for holding said power means against operation, means for moving said carrier from toasting position to said receiving position, means movable with said carrier and operable by the bread as it approaches the carrier when in said receiving position for releasing said holding means so that said power means operates to move the carrier from said receiving position to toasting position, and timing means operable when said carrier is in toasting position for energizing said last mentioned means and at the end of a timing operation for causing said third mentioned means for moving the carrier from said toasting position back to said receiving position.

11. A bread toaster embodying therein a bread carrier movable from a bread receiving position to a toasting position and back to said receiving position, power means for moving the carrier from said receiving position to toasting position, means for holding said power means against operation, means movable with the carrier and having parts positioned above the same and adapted for engagement by the bread as the same approaches said carrier when in receiving position for releasing said holding means so that said power means operates to move the carrier from the receiving position to toasting position, means for moving the carrier from toasting position to receiving position, and timing means operable when said carrier is in toasting position for energizing said last mentioned means and at the end of a timing operation causing said last mentioned means to move the carrier from said toasting position back to said receiving position.

12. A bread toaster embodying therein a bread carrier movable from a bread receiving position to a toasting position and back to said receiving position, normally energized power means for moving the carrier from said receiving position to said toasting position, electrical operable means for releasably holding said power means energized and against operation, means movable with said carrier and controlling said electrical operable means and operable by engagement by bread as the same approaches said carrier while in said receiving position for actuating said electrically operable means to release said power means so that the same moves the carrier from receiving to toasting position, means for moving the carrier from toasting position to receiving position, and timing means operable when said carrier is in toasting position for energizing said last mentioned means and at the end of a timing operation for causing said last mentioned means to return said carrier to said receiving position.

13. A bread toaster embodying therein a bread carrier movable from a bread receiving position to a toasting position and back to said receiving position, lever-like means operatively connected at one end to said carrier and pivotally mounted at its other end for a swinging movement whereby said carrier is moved as mentioned, spring means operatively associated with said lever-like means, a part of said spring means being normally energized when said carrier is in said receiving position, means for holding said lever-like means against movement under the action of the energized part of said spring means, means movable with the carrier and adapted to be engaged and actuated by the bread when the same approaches but before it engages the carrier for releasing the holding means so that the carrier is moved to toasting position, and timing means operable to hold the carrier in toasting position for predetermined period of time while energizing another part of said spring means, said timing means at the end of a timing operation acting to release said other part of said spring means so that it functions through said lever-like means to move the carrier back to said bread receiving position.

14. A bread toaster embodying therein a bread carrier movable from a bread receiving position to a toasting position and back to said receiving position, lever-like means operatively connected at one end to said carrier and pivotally mounted at its other end for a swinging movement whereby said carrier is moved as mentioned, a spring operatively associated with a part of said lever-like means and normally energized when said carrier is in said receiving position, means for holding said lever-like means against movement under the action of said energized spring, means movable with the carrier and adapted to be engaged and actuated by the bread when the same approaches but before it engages the carrier for releasing said holding means so that said carrier is moved to toasting position under the action of said spring, a second and stronger spring associated with said lever-like means for returning the carrier from toasting position to receiving position, and timing means operable to hold the carrier in toasting position for a predetermined period of time while energizing said second spring, said timing means at the end of a timing operation acting to release said second spring so that it functions through said lever-like means to move the bread carrier back to said bread receiving position.

15. A bread toaster embodying therein a bread carrier movable from a bread receiving position to a toasting position and back to said receiving position, lever-like means operatively connected at one end to said carrier and pivotally mounted at its other end for a swinging movement whereby said carrier is moved as mentioned, a spring operatively associated with a part of said lever-like means and normally energized when said carrier is in said receiving position, means for holding said lever-like means against movement under the action of said energized spring, movable with the carrier and adapted to be engaged and actuated by the bread when the same approaches but before it engages the carrier for releasing said holding means so that said carrier is moved to toasting position under the action of said spring, a second and stronger spring associated with said lever-like means for returning the carrier from toasting position to receiving position, and timing means operable to hold the carrier in toasting position for a predetermined period of time while energizing said second spring, said timing means at the end of a timing operation acting to release said second spring so that it functions through said lever-like means to move the bread carrier back to said bread receiving position, said lever-like means when returning the carrier to bread receiving position energizing said first mentioned spring.

16. A bread toaster embodying therein a plurality of bread carriers movable simultaneously from a bread receiving position to a toasting position and back to said receiving position, a plurality of lever arms, each operatively connected at one end to an associated carrier and operatively connected together at the other end and there mounted for a swinging movement whereby said carriers are moved as mentioned, spring means operatively associated with said lever arms, a part of said spring means being normally energized when said carriers are in said receiving position, means for holding said lever arms against movement under the action of the energized part of said spring means, bread actuatable means for releasing the holding means so that said carriers are moved to toasting position, and timing means operable to hold the carrier in toasting position for a predetermined period of time while energizing another part of said spring means, said timing means at the end of a timing operation acting to release said other part of said spring means so that it functions through said lever arms to move said carriers back to receiving position.

17. A bread toaster embodying therein a pair of laterally spaced bread carriers simultaneously movable from a bread receiving position to a toasting position and back to said receiving position, a pair of lever arms, each operatively connected at one end to an associated bread carrier and operatively connected together at the other end and there mounted for a swinging movement whereby said carriers are moved as mentioned, a spring operatively associated with one of said arms and normally energized when the carrier is in said receiving position, means for holding said arms against the action of said energized spring, bread actuatable means for releasing said holding means so that said carriers are moved to toasting position, a second spring operatively associated with the other of said lever arms for moving the carriers from the toasting position to the receiving position, and timing means for holding the carriers in toasting position for a predetermined period of time while energizing said second spring, said timing means at the end of a timing operation acting to release said second spring so that it functions through its associated lever arm to move the carriers to receiving position.

18. A bread toaster embodying therein a bread carrier movable from a bread receiving position to a toasting position and back to said receiving position, lever-like means operatively connected at one end to said carrier and pivotally mounted at its other end for a swinging movement whereby said carrier is moved as mentioned, spring means operatively associated with said lever-like means, a part of said spring means being normally energized when said carrier is in said receiving position, means for holding said lever-like means against movement under the action of the energized part of said spring means, bread actuatable means for releasing the holding means so that the carrier is moved to toasting position, timing means including a rotatably driven member for holding the carrier in the toasting position for a predetermined period of time, said rotatably driven member operating during a timing operation to energize another part of said spring means, and further operating at the end of said timing operation to release said another part of said spring means to return the carrier to receiving position, a variable speed motor for driving said rotatably driven member, means for determining the speed of said motor, and heat-responsive means for controlling said last mentioned means.

19. In a bread toasting mechanism, a rock shaft, a pair of arms fixed to and extending outwardly from said shaft, and swingable from one position to another position and back to the first position, a spring fixed at one end and engaged at its other end with one of said arms and adapted to move both arms from said one position to said another position when energized, a member pivotally mounted on said rock shaft, a second and stronger spring fixed at one end to said member and operatively connected at the other end with said other arm and adapted to move both arms back to the first position when energized, means for holding said arms in the first position against the action of the first spring when it is energized, timing means including a rotatable member for determining the length of time said arms remain in said another position, said rotatable member during a timing operation operating to energize said second spring and at the end of said timing operation releasing the second spring so that the energy therein causes said arms to swing back to the first position, said arms in their swinging movement back to the first position reenergizing the first mentioned spring.

20. In a bread toasting mechanism, a rock shaft, a pair of arms fixed to and extending outwardly from said shaft, and swingable from one position to another position and back to the first position, a spring fixed at one end and engaged at its other end with one of said arms and adapted to move both arms from said one position to said another position when energized, a member pivotally mounted on said rock shaft, a second and stronger spring fixed at one end to said member and operatively connected at the other end with said other arm and adapted to move both arms back to the first position when energized, means for holding said arms in the first position against the action of the first spring when it is energized, timing means for determining the length of time said arms remain in said another position, said timing means including a rotatably driven member, a second driven member, a one-way clutch means between said driven members, and means connecting said driven member with said rock shaft whereby said second driven member in a part of said movement energizes said second spring member and in another part of said movement releases said second spring member to cause said arms to swing from the second position back to the first position.

21. A bread toaster embodying therein a bread carrier movable from a bread receiving position to a toasting position and back to said receiving position, power means for moving the carrier from said receiving position to said toasting position, means actuated by the bread when dropped into the toaster for causing said power means to move the carrier from said receiving to said toasting position, means for holding said carrier in said toasting position for a predetermined period of time, and means operating at the expiration of said period of time for returning said carrier to said bread receiving position.

22. A bread toaster embodying therein a bread carrier movable from a bread receiving position to a toasting position and back to said receiving position, a spring for moving the carrier from said receiving position to said toasting position, a second spring for moving the carrier from said toasting position to said receiving position, means actuated by the bread when dropped into the toaster for causing the first mentioned spring to move the carrier from said receiving position to said toasting position and timing means operable when said carrier is in said toasting position for energizing said second spring and at the end of a timing operation causing said second spring to return said carrier to said receiving position.

ROY J. ANDERSON.